United States Patent
Kessler et al.

(10) Patent No.: US 9,343,788 B2
(45) Date of Patent: May 17, 2016

(54) BATTERY CELL

(71) Applicant: Robert Bosch GmbH, Stuttgart (DE)

(72) Inventors: Martin Kessler, Schwaebisch Gmuend (DE); Volker Doege, Dischingen (DE); Andy Tiefenbach, Vaihingen-Horrheim (DE); Alexander Schmidt, Donaueschingen (DE)

(73) Assignee: Robert Bosch GmbH, Stuttgart (DE)

( * ) Notice: Subject to any disclaimer, the term of this patent is extended or adjusted under 35 U.S.C. 154(b) by 178 days.

(21) Appl. No.: 13/959,913

(22) Filed: Aug. 6, 2013

(65) Prior Publication Data

US 2014/0044996 A1    Feb. 13, 2014

(30) Foreign Application Priority Data

Aug. 7, 2012 (DE) .......... 10 2012 213 947

(51) Int. Cl.
*H01M 10/42* (2006.01)
*H01M 16/00* (2006.01)

(52) U.S. Cl.
CPC .......... *H01M 16/00* (2013.01); *H01M 10/4264* (2013.01); *H01M 2200/00* (2013.01)

(58) Field of Classification Search
CPC .................................. H01M 10/4264
USPC ............................................. 429/7
See application file for complete search history.

(56) References Cited

U.S. PATENT DOCUMENTS

| | | | |
|---|---|---|---|
| 2005/0083021 A1* | 4/2005 | Mahon | 320/166 |
| 2010/0159293 A1* | 6/2010 | Hempel | 429/10 |
| 2011/0189533 A1* | 8/2011 | Reis et al. | 429/178 |
| 2014/0176067 A1* | 6/2014 | Suzuki et al. | 320/108 |

FOREIGN PATENT DOCUMENTS

| DE | 102010041028 | | 3/2012 |
|---|---|---|---|
| WO | WO 2013021801 A1 * | | 2/2013 |

* cited by examiner

*Primary Examiner* — Stewart Fraser
(74) *Attorney, Agent, or Firm* — Michael Best & Friedrich LLP

(57) ABSTRACT

A battery cell (10), having a low-inductance, capacitive parallel path interconnected between the poles of the battery cell (10), wherein the parallel path is embodied as a discrete capacitor (11).

4 Claims, 2 Drawing Sheets

BATTERY CELL

BACKGROUND OF THE INVENTION

The invention relates to a battery cell. The invention furthermore relates to a battery module.

In most fields of use of electrical battery cells, apart from a comparatively small superposed ripple component, approximately direct current is drawn from the battery cells or fed into the battery cells.

An influence of a distributed inductance of a construction of the battery cell increases as the AC component of the current increases. Conventional cells have a metallic housing, a typical metal being aluminum. Situated therein are one or a plurality of cell windings, outgoing conductor films and forks, which are electrically conductively connected toward the outside to terminal poles of the cell. In order to avoid oxidation of the cell housing, the electrical potential thereof is put at positive, preferably by a direct electrical connection of the housing to the positive pole.

The prior art discloses battery systems having an integrated converter in which varying a phase voltage necessitates rapidly changing the current conduction through a battery module or past the battery module. In this case, e.g. in the automotive sector, the battery cells or modules of the battery systems mentioned are operated in relatively high frequency ranges up to the kilohertz range in order to drive an electric machine with the AC voltages generated.

An inductive component of the cell impedance acts toward the outside in relation to a power electronics system and, during the switching processes in combination with high currents, can generate high energy losses in the semiconductor switches used in the power electronics system. In certain unavoidable switching processes, avalanche breakdown (avalanche operation of the semiconductor switches) occurs in a manner driven by the electrical energy stored in the inductances.

DE 10 2010 041 028 A1 discloses an energy supply system having a controllable energy store serving for controlling and for supplying electrical energy to an n-phase electric machine where n≥1. In this case, the controllable energy store has n parallel energy supply branches having in each case at least two series-connected energy storage module comprising in each case at least one electrical energy storage cell with an assigned controllable coupling unit.

SUMMARY OF THE INVENTION

The invention provides a battery cell, having a low-inductance, capacitive parallel path interconnected between the poles of the battery cell, wherein the parallel path is embodied as a discrete capacitor.

One preferred embodiment of the battery cell according to the invention is characterized in that the capacitor has no leads. In this way, an impedance having the longest possible resistive and inductive components is presented, which advantageously reduces a total inductance of the battery cell that acts toward the outside during switching processes.

One preferred embodiment of the battery cell is characterized in that the capacitor is arranged within the cell housing. In this way, the capacitor can advantageously be integrated into the battery cell during a process for producing the cell.

One advantageous development of the battery cell provides for the capacitor to be interconnected over a large area between an inner side of the cell housing and an outgoing conductor of the negative pole of the battery cell. As a result, a high capacitance value can be provided on account of a large area extent of the capacitor.

One advantageous development of the battery cell is distinguished by the fact that the capacitor at least partly fills a space between the cell housing and the outgoing conductor of the negative pole. In this way, an empty space conventionally already present in the battery cell is advantageously utilized in a practical manner, as a result of which the design of the battery cell does not have to be modified in order to equip the battery cell with the capacitor.

A further preferred embodiment of the battery cell is distinguished by the fact that the capacitor is arranged outside the cell housing. This affords the advantage that the battery cell can easily also subsequently be retrofitted with the capacitor.

One preferred embodiment of the battery cell provides for the capacitor to be interconnected between outer surfaces of the negative pole and the cell housing, wherein a substantially complete areal contact-connection to outer surfaces of the negative pole is provided. This enables the capacitor according to the invention to be fitted in a simple manner, a good mechanical fit of the capacitor on the battery cell being supported by the extensive areal contact-connection.

One preferred embodiment of the battery cell provides for the capacitor to comprise a plurality of capacitor elements which are interconnected in parallel with one another. As a result, for a presentation of a total capacitance to be defined, it is advantageously possible to make a selection from standard components having different specifications.

One preferred embodiment of the battery cell is characterized in that the capacitor is embodied as an encapsulated component having the lowest possible equivalent serial resistance and the lowest possible equivalent serial inductance. In this way, it is possible to use a standard component, for example a tantalum capacitor of sintered design, which presents a capacitive behavior that is as ideal as possible.

What is considered to be advantageous in the case of the invention is that a total impedance of the battery cell or of a battery module comprising a plurality of interconnected battery cells at high frequencies and an inductance of the elements mentioned that acts toward the outside can advantageously be greatly reduced by means of the low-inductance, capacitive parallel path. With the use of the battery cell according to the invention in a battery system having an integrated converter, harmful effects of avalanche operation of electronic semiconductor switches of the converter can advantageously be reduced in this way. In order to provide the capacitive parallel path as a discrete capacitor, a design of the battery cell can advantageously remain substantially unchanged, whereby simple retrofitting of the battery cell with the capacitor is also supported.

BRIEF DESCRIPTION OF THE DRAWINGS

Further features and advantages of the present invention are explained below on the basis of a number of embodiments with reference to figures. In this case, all features described or illustrated form the subject matter of the invention by themselves or in any desired combination and independently of their wording or illustration in the description or in the figures. The figures are primarily intended to elucidate the principles essential to the invention, and elements of the battery cell which are not essential to the invention are not illustrated. In the figures, identical reference signs designate identical or functionally identical elements.

In the figures.

DETAILED DESCRIPTION

Figure 1:
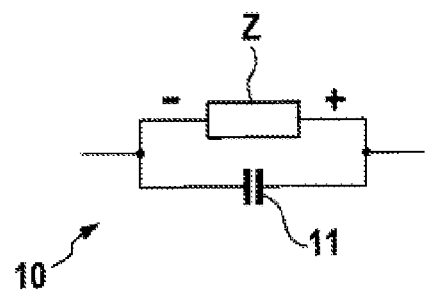
FIG. 1 shows an electrical equivalent circuit diagram of an embodiment of the battery cell according to the invention.

FIG. 1 illustrates a fundamental electrical equivalent circuit diagram of an embodiment of the battery cell according to the invention. The battery cell 10, which is used e.g. in a high-voltage battery for the motor vehicle sector, has an electrical cell impedance Z, wherein a capacitance is interconnected in parallel with a positive pole and with a negative pole of the cell impedance Z. The capacitance is preferably embodied as a discrete electronic component in the form of a capacitor 11 without leads. The capacitor 11 preferably has a low equivalent serial resistance (ESR) and a low equivalent serial inductance (ESL). One component having such specifications is e.g. a tantalum capacitor of sintered design. The equivalent circuit diagram in FIG. 1 thus represents a type of resonant circuit in which an inductance value acting toward the outside is intended to be minimized by means of a design of a capacitance value of the capacitor 11.

Figure 2:
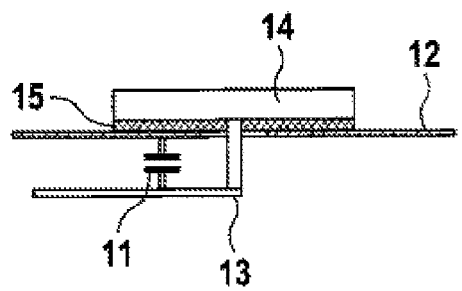
FIG. 2 shows a fundamental design detail of an embodiment of the battery cell according to the invention.

FIG. 2 shows a fundamental design detail of an embodiment of the battery cell according to the invention. It is evident that a capacitor 11 is interconnected between a cell housing 12 of the battery cell, said cell housing being at positive potential, and an outgoing conductor 13 of the negative pole 14. The capacitor 11 has no electrical leads, as a result of which the capacitive parallel path between the poles is realized over the shortest possible distance. An insulating layer 15 is arranged between the negative pole 14 and the cell housing 12, and electrically insulates the negative pole 14 from the cell housing 12.

Figure 3:
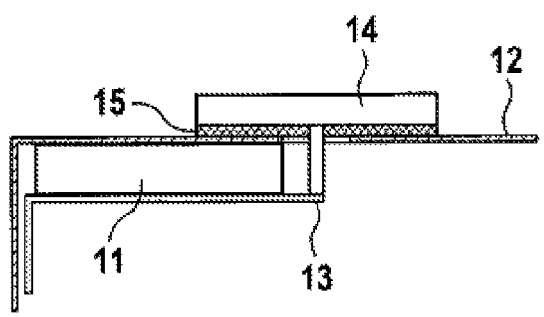
FIG. 3 shows a fundamental design detail of a further embodiment of the battery cell according to the invention.

FIG. 3 shows, in a higher degree of detailing, a design detail of a further embodiment of the battery cell according to the invention. It can be discerned that a capacitance in the form of a discrete, encapsulated capacitor 11 is arranged in an interior of the battery cell 10 between the cell housing 12 and the outgoing conductor 13 of the negative pole 14. The parallel connection of the capacitor 11 between the two electrical poles of the battery cell 10 is provided in this way. In this way, an empty space already present in a manner governed by the system within the cell housing 12 can advantageously be utilized in order to realize the low-inductance, capacitive parallel path according to the invention in relation to the poles.

Figure 4:
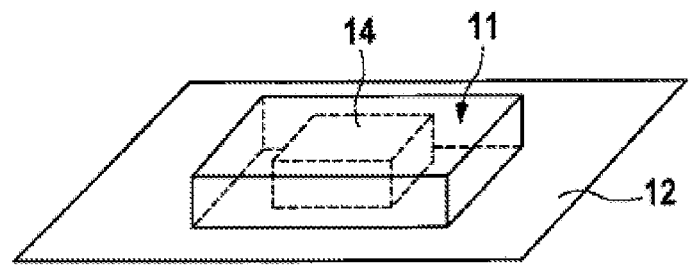
FIG. 4 shows a fundamental design detail of a further embodiment of the battery cell according to the invention.

FIG. 4 shows, in a perspective view, a design detail of a further embodiment of the battery cell 10 according to the invention. It is evident that the capacitor 11 is arranged as it were around the negative pole 14 of the battery cell, wherein a substantially complete areal contact-connection of a first electrode of the capacitor 11 to outer or side surfaces of the negative pole 14 is provided. Moreover, with its second electrode the capacitor 11 makes contact with the surface of the cell housing 12, which is at positive potential. In this way, too, particularly simple retrofitting of the battery cell 10 with the capacitance 11 according to the invention is supported since the capacitor 11 having an appropriate design merely has to be placed onto the negative pole 14.

Figure 5:
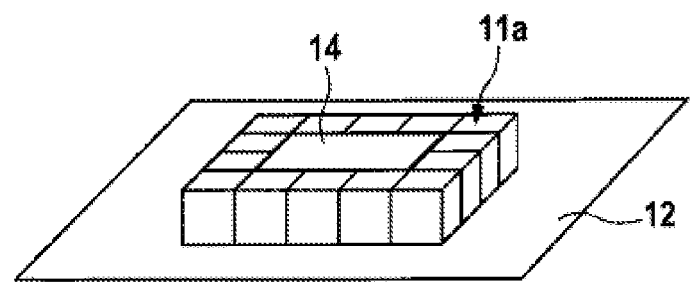
FIG. 5 shows a fundamental design detail of a further embodiment of the battery cell according to the invention.

FIG. 5 shows, in a perspective view, a design detail of a further embodiment of the battery cell according to the invention. In this case, the capacitor 11 has a plurality of relatively small, discrete capacitor components or capacitor elements 11a, which are arranged, in a manner electrically connected in parallel with one another, substantially completely around the negative pole 14 of the battery cell on the surface of the housing 12. In this case, a total capacitance Cp of the capacitor 11 comprising the individual capacitor elements 11a results from the following mathematical relationship:

$$Cp = \sum_{i=1}^{n} Cpi$$

Cp total capacitance value
i number of capacitor elements 11a
Cpi capacitance value of the capacitor 11

With this embodiment, therefore, it is advantageously possible, if necessary, to resort to respectively different standard components each having different electrical specifications in order to realize the required total capacitance.

Figure 6:
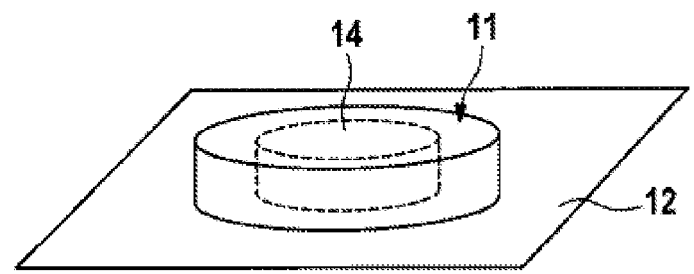
FIG. 6 shows a fundamental design detail of a further embodiment of the battery cell according to the invention.

Preferably, in the case of the embodiments of the battery cell 10 from FIG. 4 and FIG. 5, shapings of the negative pole 14 and of the capacitor 11 are adapted to one another, as a result of which a very flexible mechanical design of the negative pole 14 and of the capacitor 11 can advantageously be realized. In FIG. 4 and FIG. 5, the capacitor 11 and the capacitor elements 11a, respectively, are embodied in cubic or parallelepipedal fashion; in the embodiment of the battery cell 10 in FIG. 6 it can be discerned that the negative pole 14 and the capacitor 11 can alternatively also be embodied in cylindrical fashion, with the result that circular outer forms of the negative pole 14 and of the capacitor 11 are realized in this case.

To summarize, the present invention provides a technical solution for reducing a cell inductance of a battery cell that acts toward the outside in the case of use in a battery system having an integrated converter at high switching frequencies. As a result, it is possible advantageously to reduce harmful degradation or aging effects of electronic power semiconductor switches (e.g. MOS-FETs or IGBTs interconnected with one another in a B4 bridge circuit) on account of switching processes at high frequencies, or even to avoid destruction of the semiconductor switches. Advantageously, as a result a service life of said semiconductor switches can be significantly lengthened and said semiconductor switches do not have to be subjected to costly certification processes for avalanche operation. Moreover, an efficiency of the semiconductor switches can be increased as a result of the reduced losses.

Advantageously, for realizing the capacitive parallel path with the capacitance being introduced internally into the battery cell, no additional structural space of the cell is required, and only a slightly enlarged structural space of the cell with negligible effects at the module level. Consequently, the external module dimensions also do not increase significantly with the realization of the invention at the module level. For implementing the invention, therefore, a design of the battery cells virtually need not be modified or need only be modified very slightly. Advantageously, conventionally capacitors with known technology can be used, in which case, if appropriate, it is merely necessary to provide a respectively suitable design.

Although the present invention has been described on the basis of preferred exemplary embodiments, it is not restricted thereto. A person skilled in the art will therefore be able to modify the described features of the invention or combine them with one another, without departing from the essence of the invention.

What is claimed is:

1. A battery cell, having a capacitive parallel path interconnected between poles of the battery cell, wherein the parallel path is embodied as a discrete capacitor, wherein the capacitor has no leads, and wherein the capacitor is arranged outside a cell housing.

2. The battery cell according to claim 1, characterized in that the capacitor comprises a plurality of capacitor elements which are interconnected in parallel with one another, wherein each capacitor element of the plurality of capacitor elements has no leads.

3. The battery cell according to claim 1, characterized in that the capacitor is embodied as an encapsulated component.

4. A battery module comprising a plurality of battery cells according to claim 1.

* * * * *